United States Patent
Lehmann

(10) Patent No.: US 7,808,647 B2
(45) Date of Patent: Oct. 5, 2010

(54) SHAPE MEASURING METHOD

(75) Inventor: Peter Lehmann, Gottingen (DE)

(73) Assignee: Carl Mahr Holding GmbH, Gottlingen (DE)

( * ) Notice: Subject to any disclaimer, the term of this patent is extended or adjusted under 35 U.S.C. 154(b) by 0 days.

(21) Appl. No.: 12/572,935

(22) Filed: Oct. 2, 2009

(65) Prior Publication Data
US 2010/0020329 A1 Jan. 28, 2010

Related U.S. Application Data

(62) Division of application No. 11/579,090, filed as application No. PCT/EP2005/005661 on May 25, 2005, now Pat. No. 7,599,068.

(30) Foreign Application Priority Data
May 28, 2004 (DE) .................. 10 2004 026 193

(51) Int. Cl.
*G01B 9/02* (2006.01)
(52) U.S. Cl. .................................... 356/489
(58) Field of Classification Search ............. 356/484, 356/485, 486, 489
See application file for complete search history.

(56) References Cited

U.S. PATENT DOCUMENTS

| | | | |
|---|---|---|---|
| 3,767,307 A * | 10/1973 | Bowker | ........... 356/489 |
| 4,417,813 A * | 11/1983 | Bartholomew | ........... 356/489 |
| 5,133,601 A | 7/1992 | Cohen et al. | |
| 5,159,408 A * | 10/1992 | Waldenmaier et al. | ...... 356/485 |
| 5,398,113 A | 3/1995 | De Groot | |
| 5,404,221 A | 4/1995 | De Groot | |
| 5,784,161 A | 7/1998 | Bechstein et al. | |
| 6,014,214 A * | 1/2000 | Li | ............... 356/511 |
| 6,137,574 A | 10/2000 | Hill | |

(Continued)

FOREIGN PATENT DOCUMENTS

WO     WO 02082008     10/2002

OTHER PUBLICATIONS

Kenichi Hibino et al., "Simultaneous Measurement of Surface Shape and Variation in Optical Thickness of a Transparent Parallel Plate in Wavelength-Scanning Fizeau Interferometer", Feb. 20, 2004, vol. 43, No. 6, Applied Optics.

*Primary Examiner*—Gregory J Toatley, Jr.
*Assistant Examiner*—Scott M Richey
(74) *Attorney, Agent, or Firm*—Fitch, Even, Tabin & Flannery; Norman N. Kunitz

(57) ABSTRACT

A method for detecting shapes based on interferometric observation of an object surface subjected to narrow-band lighting. Movement of the interferometer (1) relative to the object surface (2) generates a measuring signal on a photo receiver, e.g., camera circuit (5), from which two extremely closely positioned signal frequencies ($f_o$) and ($f_o+\Delta f$) are extracted. The phase difference between the two signal components is used for determining the distance and/or the change in distance. The method has a large unambiguousness range, making it possible to have a large depth measurement range, and can be used for workpieces having offset areas on the surface, wherein the measurement is not disturbed along the edges and the offset areas. The method also allows examining strongly inclined surfaces having a steep inclination such that that traditional methods based on evaluating interference lines cannot be used because of a high density of the interference lines.

17 Claims, 5 Drawing Sheets

U.S. PATENT DOCUMENTS

| | | |
|---|---|---|
| 6,330,065 B1 | 12/2001 | Hill |
| 6,480,285 B1 | 11/2002 | Hill |
| 6,724,485 B1 | 4/2004 | Drabarek |
| 7,057,736 B2 | 6/2006 | Hill |
| 7,139,081 B2 | 11/2006 | De Groot |
| 7,193,720 B2 * | 3/2007 | Gatt .......................... 356/489 |
| 7,271,918 B2 | 9/2007 | De Groot |
| 7,307,733 B2 * | 12/2007 | Chan et al. .................. 356/489 |
| 7,319,782 B2 * | 1/2008 | Hogan ........................ 382/128 |
| 7,324,214 B2 | 1/2008 | De Groot |
| 7,345,770 B2 * | 3/2008 | Chan et al. .................. 356/489 |
| 7,382,465 B1 * | 6/2008 | Pepper ........................ 356/485 |
| 7,426,039 B2 * | 9/2008 | Badami et al. .............. 356/503 |
| 2004/0085544 A1 | 5/2004 | De Groot |
| 2004/0156053 A1 * | 8/2004 | Wolleschensky et al. .... 356/485 |
| 2004/0189999 A1 | 9/2004 | De Groot et al. |
| 2006/0227316 A1 * | 10/2006 | Gatt .......................... 356/5.09 |

* cited by examiner

SHAPE MEASURING METHOD

CROSS-REFERENCE TO RELATED APPLICATION

This application is a division of applicant's U.S. patent application Ser. No. 11/579,090 filed Oct. 30, 2006, now U.S. Pat No. 7,599,068 B2, which is the National Stage filing under 35 U.S.C. §371 of International Application No. PCT/EP2005/005661, filed May 25, 2005, and claims priority of German Patent Application 10 2004 026 193.8, filed May 28, 2004, the subject matter of which is hereby, in its entirety, incorporated herein by reference.

BACKGROUND OF THE INVENTION

The invention relates to a shape measuring method for detecting the shape of a workpiece surface by interferometric measuring method, as well as to a corresponding measuring device for implementing this method.

Interferometric methods are frequently used in practical operations for the distance or also the shape measuring, wherein these methods are used to determine the distance between a point or a point array on a surface and a measuring device. Difficulties can arise in the process if the workpiece surface contains edges or gaps or if the shape to be imaged is large enough, so that it either exceeds the focal depth or the measuring range of the measuring device.

U.S. Pat. No. 5,133,601, for example, discloses a surface profile detection method which can be attributed to the white-light interferometry. The measuring device makes use of a double-beam interferometer with a measuring beam and a reference beam. Interference can be detected only if the optical path lengths between the object wave and the reference wave differ by less than the coherence length of the light that is used. The use of white light therefore results in an extremely low depth resolution of the measuring device.

U.S. Pat. No. 5,398,113 also discloses a method which can be attributed to white-light interferometry. In that case, the object is viewed with the aid of a camera through a double-beam interferometer, wherein the light source used is a polychromatic or white light source. The images recorded by the camera are interference images. The interference image changes during a relative movement of the objective and the workpiece in Z direction. Signals are thus generated at the individual pixels of the camera, which are subjected to a pixel-by-pixel digital Fourier analysis.

The digital Fourier analysis is used to detect discrete frequencies of a spectrum, wherein the discrete frequencies cannot be positioned with optional density next to each other, thus resulting in a limited depth resolution. In addition, problems can develop along the edges or shoulders of a body.

Based on this, it is the goal of our invention to provide a measuring method for detecting the height profile or the shape of a workpiece with the aid of interferometry, which method can be realized with low apparatus expenditure and achieves good measuring accuracy.

SUMMARY OF THE INVENTION

The above goal is generally achieved with the measuring method according to the invention which uses a light source with polychromatic light for illuminating the object. Light sources generating two different spectral lines can also be used, for example, gas-discharge lamps or luminous substance mixtures, wherein semiconductor light diodes can also be used. Two light sources are preferably used, for which the average wavelengths (mass center of wavelengths or spectral centroids) differ by $\Delta\lambda$. The light sources are preferably activated or deactivated with a time delay. The difference between the spectral centroids advantageously ranges from less than 1 nm to approximately 200 nm. The light source thus generates at least two spectral lines, but preferably a mixture of various light components, for which the wavelength differs by only a few nanometers.

In a first embodiment, the illumination is provided by a single LED (light-emitting diode) or a SLD (super luminescent diode) or a laser diode provided with an optical filter, which permits the passage of only a few discrete spectral lines from the continuous spectrum of the light source in a limited wavelength interval. The width of the discrete "spectral lines" should be narrow enough, so that a beat would occur in the inverse Fourier transformation of the spectrum. This type of light can also be generated by superimposing light rays emitted by several monochromatic light sources (for example, a laser), which sources emit light having different wavelengths. If a sufficiently wide spectral width is selected for the spectral lines used for the measuring, then beat signals result for which the secondary maxima show strongly declining amplitudes as compared to the main maximum, so that the height position of an associated object point can be roughly outlined by evaluating the amplitude of the measured beat signal. The filtered light consequently contains different discrete wavelength components. In contrast to known two-wavelengths or multiple wavelengths methods, these discrete wavelength components are not obtained through physical filtering, but through a suitable calculated signal evaluation for extracting the desired frequencies from the measured signal of superimposed signal components. This is not achieved through a determination of the spectrum of the received signals, as would be the case with the Fourier analysis, but through a purposeful mathematical filtering out of preferably only two spectral components from the measuring signal. In contrast to the presently used methods that are based, for example, on the Fourier analysis, the analyzed frequencies can thus be positioned optionally close to each other, meaning the signal frequency difference $\Delta f$ can be kept optionally small. Depth measuring ranges of clearly more than 300 μm can thus be reached along with measuring accuracies in the nanometer range. Changes in height, which exceed this value, can generally be detected by means of a focal point monitoring and can be clearly assigned. Strongly profiled surfaces can thus be examined with the measuring method according to the invention, which so far have eluded an interferometric measuring. The method is hardly affected or not affected at all by discontinuity in the surface, surface inclinations, curvatures of the object to be measured, and $2\pi$ phase jumps and is thus robust, simple and precise. The surface appearance of the workpiece to be examined furthermore does not play an important role. Optical surfaces as well as diffuse scattering surfaces can be examined. As a result of using chromatic, non-monochromatic but very narrow-band light, the reflection characteristics of workpiece surfaces do not play a prominent role.

The signal evaluation is simplified when using two light sources, which are operated in a clocked time-division multiplex operation and consequently light up alternately. As a result, camera images are alternately read in, initially using the first light source and subsequently using the second light source. The optical path length difference between measuring beam and reference beam can remain constant during the recording of the two images or it can change by the scanning interval $\Delta l$.

The alternate scanning, that is to say the use of a time delay between the activities of both light sources, makes it possible to easily separate the spectral components of the two light sources during the image evaluation. The phase positions for the interference signals of the two-spectral centroids can be determined with high precision. With the aid of the phase difference and the known synthetic wavelength $\Lambda$, which is to be determined from the signals, the first estimated value for the height position is obtained with an unambiguous range of $\pm\Lambda/4$. A more precise estimate of the height position is then obtained on the basis of one of the two spectral centroids $\lambda_1$ or $\lambda_2$. If the height difference of an object exceeds $\pm\lambda_1/4$ or $\pm\lambda_2/4$, the method according to the invention permits a considerably more reliable and/or precise detection of the topography than is possible with the known methods. In addition, the apparatus expenditure is low as compared to that used for the conventional multiple wavelength interferometry.

Fast operating light sources, for example semiconductor-based light sources (laser diodes, LEDs, superluminescent diodes) are preferably used. One advantage of the alternating scanning is that the spectra of the individual light sources can overlap in broad areas and must differ only in their mass center of wavelengths or spectral centroids. As a result it is possible to generate signals with gravity center wavelength differences in the nanometer range with little expenditure. If at least one of the two light sources used is short coherent, then the method according to the invention makes it possible to combine the advantages of the double-wavelength interferometry with the advantages of the white light interferometry. For this, the height position of the object can first be localized roughly with the aid of a coherence peak evaluation known from the white light interferometry. In a second step, the phase position of the synthetic wavelength relative to the position of the coherence peak is then used to further localize the height position of the measuring point under consideration. In a third step, the height position is the determined precisely with one of the two or with both spectral centroids.

The frequency difference $\Delta f$ used for the evaluation relates to the signal frequency and is defined such that the corresponding wavelength difference $\Delta \lambda$ of the light source is less than 100 nm in the most preferred case. As a result, a synthetic wavelength $\Lambda$ is obtained, which can be in the range of a few $\mu m$ to several hundred $\mu m$, thereby resulting in extremely good depth resolution for the measuring method according to the invention, with a large unambiguousness range.

Non-stabilized light sources can furthermore be used. A possible drift of the mean wavelength of the light that is used is not critical because the mean wavelengths used for the evaluation can be determined from the signal courses. The use of narrow band light sources additionally has the advantage that the observed interferences extend over a comparably large region of the object height, so that finding the measuring range is generally not a problem. The available number of signal periods for the evaluation is furthermore higher as compared to the white light interferometry, which allows reaching a higher measuring accuracy, wherein the measuring operation can also be linear.

Further details of the method according to the invention as well as a corresponding device can be inferred from the following description, if applicable in connection with the enclosed drawing and/or the dependent claims. The drawing illustrates exemplary embodiments of the invention.

DETAILED DESCRIPTION OF THE INVENTION

Figure 1:
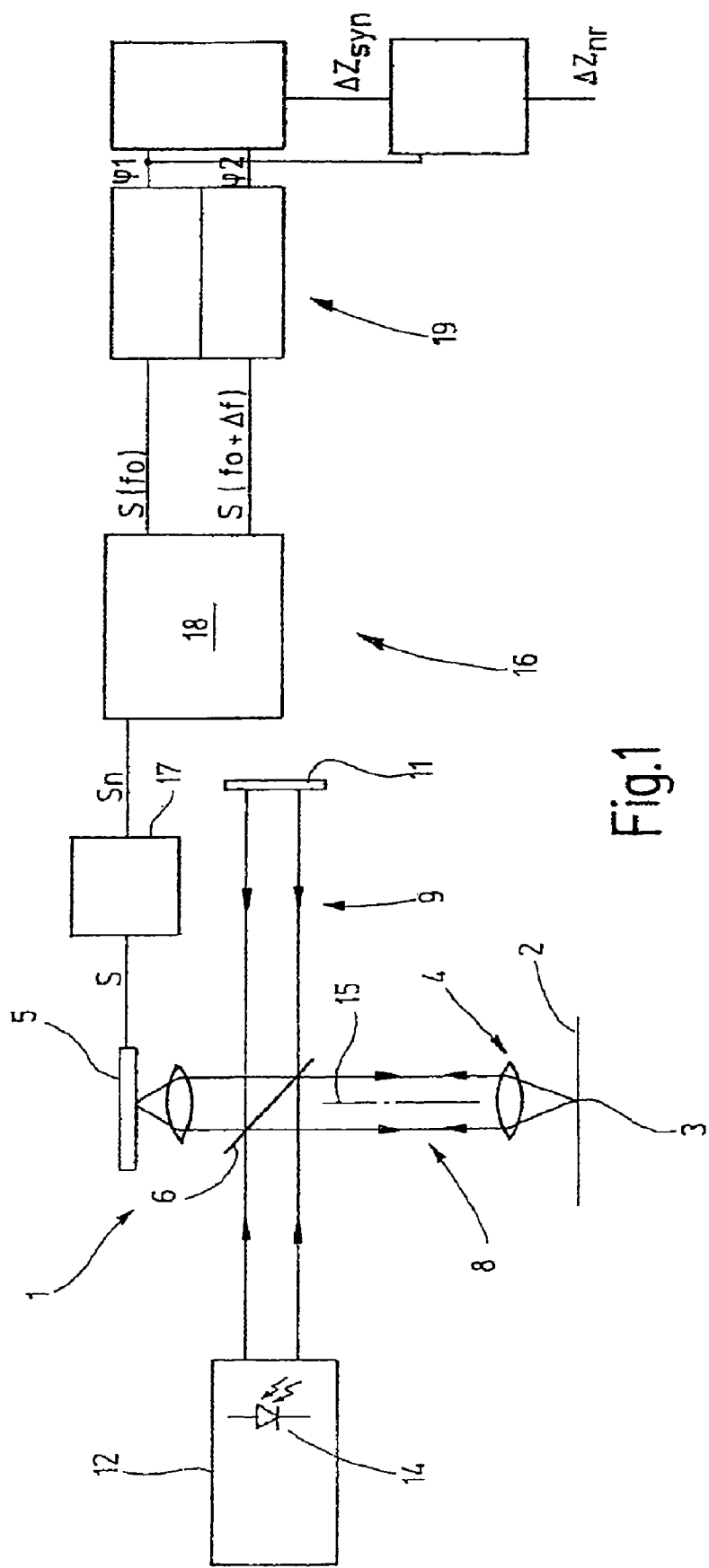
FIG. 1 shows a device for implementing the measuring method according to the invention, in a schematic representation.

FIG. 1 illustrates a device for implementing the measuring method according to the invention in an extremely schematic representation. The device includes an interferometer 1, for example, embodied as interferometric microscope, which is used for measuring an object surface 2. The measuring is realized either point-by-point or, as is preferable, in the form of a surface measurement, wherein an objective 4 detects a matrix of surface points 3 and projects this matrix via the interferometer 1 onto a camera circuit 5.

The interferometer 1 furthermore comprises a beam divider 6, which determines a measuring light path 8 with therein arranged objective 4 and a reference light path 9. A mirror 11 is arranged in the reference light path 9 while the object surface 2 is arranged in the measuring light path 8. Both light paths differ by less than the coherence length of the light source 12 that is used. A narrow-band, nearly monochromatic light source is used for this, such as a light-emitting diode 14 or the like. The light-emitting diode 14 generates a narrow-band spectrum having a width of only a few nanometers. The width of the discrete spectrum is narrow enough in this case, so that a beat would occur in the inverse Fourier transformation. If the spectral width of the spectral lines used for the measuring is selected to be sufficiently wide, beat signals are obtained, for which the secondary maxima have a strongly declining amplitude as compared to the main maximum. Evaluating the amplitude of the measured beat signal thus makes it possible to roughly localize the height position of an associated object point.

With the aid of a device that is not shown in further detail herein, the interferometer 1 can be moved toward the object surface 2, in the direction of the optical axis 15. This optical axis is substantially perpendicular to the object surface 2. The direction fixed by the optical axis 15 is also called the Z direction. It is the goal of the measurement to be carried out to determine deviations $\Delta z$ of the height of the surface point 3 (as well as adjacent surface points) to be measured in Z direction from a given basic distance Z between the objective 4 and the object surface 2.

An evaluation circuit 16 is used for this, which is embodied as computing circuit, wherein the individual functional blocks can be realized with a suitable computer program. The evaluation circuit 16 is described further in the following, with the aid of its function:

The evaluation circuit 16 shown in the drawing comprises a corresponding evaluation program, which carries out the operations, described in the following, for each pixel of the camera circuit 5 or, if applicable, also for pixels groups. The evaluation circuit comprises first of all a functional block 17, which receives at its input the intensity signal provided by the respectively viewed pixel in the form of a measuring signal s, for examples as a signal received periodically during the read-out of the camera circuit 5, or also as a continuous signal. At its output, the functional block 17 emits the scanned intensity signal $s_n$, which does not change without relative movement between the workpiece surface 2 and the interferometer 1. When realizing the measuring operation, however, a relative movement in Z direction occurs (which coincides with the direction of the optical axis 15). The scanning values $s_n$ provided during the movement are fed to a functional block 18 which multiplies the scanning values $s_n$ of the measuring signal, initially to form a suitable window function having a width of 2M. A suitable window function is a function, which permits only values within a predetermined time window and blanks out values outside of this window. For this, the values located near the window edges are preferably weighted lower. A window can be used, for example, which resembles a bell curve or a β distribution curve. Outside of the 2M scanning values, the window function assumes the function value 0. In a further computing step, a complex sum is determined with the following equation from the products of the window function and the scanning values:

$$S(f_o) = \sum_{m^n-M}^{M} S_{m+n_o} w_m \exp[-j2\pi f_o(m+n_o)l/N)]$$

$S(f_o)$ in this case is a complex-valency function of a selected first signal frequency. N represents the total number of scanning values $s_n$ of the measuring signal, while $n_o$ stands for the scanning value around which the preferably symmetrical window function is centered, and $w_m$ represents m-times the scanning value of the window function centered around 0-times the scanning value. The standardized signal frequency is $f_o$, which corresponds to the number of signal periods within the scanning window, which comprises N scanning values.

In a further computing step, the functional block 18 determines the complex-valency sum:

$$S(f_o + \Delta f) = \sum_{m^n-M}^{M} S_{m+n_o} w_m \exp[-j2\pi(f_o + \Delta f)(m+n_o)/N]$$

for a signal frequency that is displaced by $\Delta f$.

A downstream installed functional block 19 then forms the phase value $\phi_{1e}$ and $\phi_{2e}$ from both complex-valency sums, based on the following equations:

$$\varphi_{1e} = \arctan\left(\frac{\text{Im}\{S(f_o)\}}{\text{Re}\{S(f_o)\}}\right)$$

$$\varphi_{2e} = \arctan\left(\frac{\text{Im}\{S(f_o + \Delta f)\}}{\text{Re}\{S(f_o + \Delta f)\}}\right)$$

The above-listed frequency difference $\Delta f$ corresponds to a wavelength difference $\Delta\lambda$. The following is true for the signal frequency $f_o$:

$$f_o = \frac{NZ}{\lambda_o/2} = \frac{2v_o N}{\lambda_o f_{frame}}$$

with the scanning interval $Z = v_o/f_{frame}$.

For this, $v_o$ is the scanning speed at which the optical wavelength difference changes. $f_{frame}$ is the image recording frequency of the camera. $\lambda_o$ is a first light wavelength within the narrow-band spectrum of the light source. A second wavelength $\lambda_o + \Delta\lambda$, which is also located within the wavelength spectrum of the light source, leads to a second frequency component at $f_o + \Delta f$, wherein the desired frequency change is:

$$\Delta f = -\frac{2v_o N}{(\lambda_o + \Delta\lambda/2)^2 f_{frame}} \Delta\lambda$$

In general, it is much smaller than the steps used for realizing the discrete Fourier transformation.

If the phase values $\phi_{1e}$ and $\phi_{2e}$ are determined, a first estimated value $\Delta z_{syn}$ can be determined for the height difference $\Delta z$ by using the following equation:

$$\Delta z = \Delta L/2 = \frac{\Lambda \Delta \varphi}{4\pi}$$

wherein the following is applicable to the synthetic wavelength $\Lambda$:

$$\Lambda = \frac{\lambda_1 \lambda_2}{|\lambda_1 - \lambda_2|}$$

In this case, $\Delta l$ is the path length difference between reference beam and measuring beam ($\Delta l = l1$ and $l2$). For the sake of completeness, we have to note that $\phi_1$ represents the phase difference between object wave and reference wave:

$$\phi_1 = 2\pi\Delta L/\lambda_1$$

This refers to the light wavelength $\lambda_1$, while the following applies to the second wavelength $\lambda_2$:

$$\phi_2 = 2\pi\Delta L/\lambda_2$$

The following therefore applies to the phase difference $\Delta\phi$:

$$\Delta\varphi = \varphi_1 - \varphi_2 = 2\pi\Delta L\left(\frac{1}{\lambda_o} - \frac{1}{\lambda_2}\right) = 2\pi\Delta L/\Lambda$$

Following the determination of the first estimated value $\Delta z_{syn}$ for the height difference, an improved estimated value can be found based on the following term:

$$|m\lambda_o/2 + \phi_{1e}\lambda_o/4\pi - \Delta z_{syn}| = \text{minimum}$$

by initially determining a suitable whole number multiple $m_o$ so that the searched for estimated value $\Delta z_{hr}$ follows from:

$$\Delta z_{hr} = m_o\lambda_o/2 + \phi_{1e}\lambda_o/(4\pi)$$

The searched for height deviation $\Delta z$ is thus determined.

The algorithm presented herein can be realized for all image points of the camera circuit.

As compared to the conventional double-wavelength methods, one advantage of the method presented herein is that the wavelength difference $\Delta\lambda$ can be selected to be extremely small since the discrete wavelength components need not be extracted physically from the signal, e.g. by means of a spectrometer. This results in a higher unambiguousness range. For $\lambda_o = 800$ nm and $\Delta\lambda = 1$ nm, the synthetic wavelength $\Lambda$ of 640 μm is obtained and, consequently, an unambiguous range for the height change $\Delta z$ of $\pm 160$ μm. Height changes exceeding this value generally can be detected and clearly allocated by means of focal monitoring.

Figure 2:
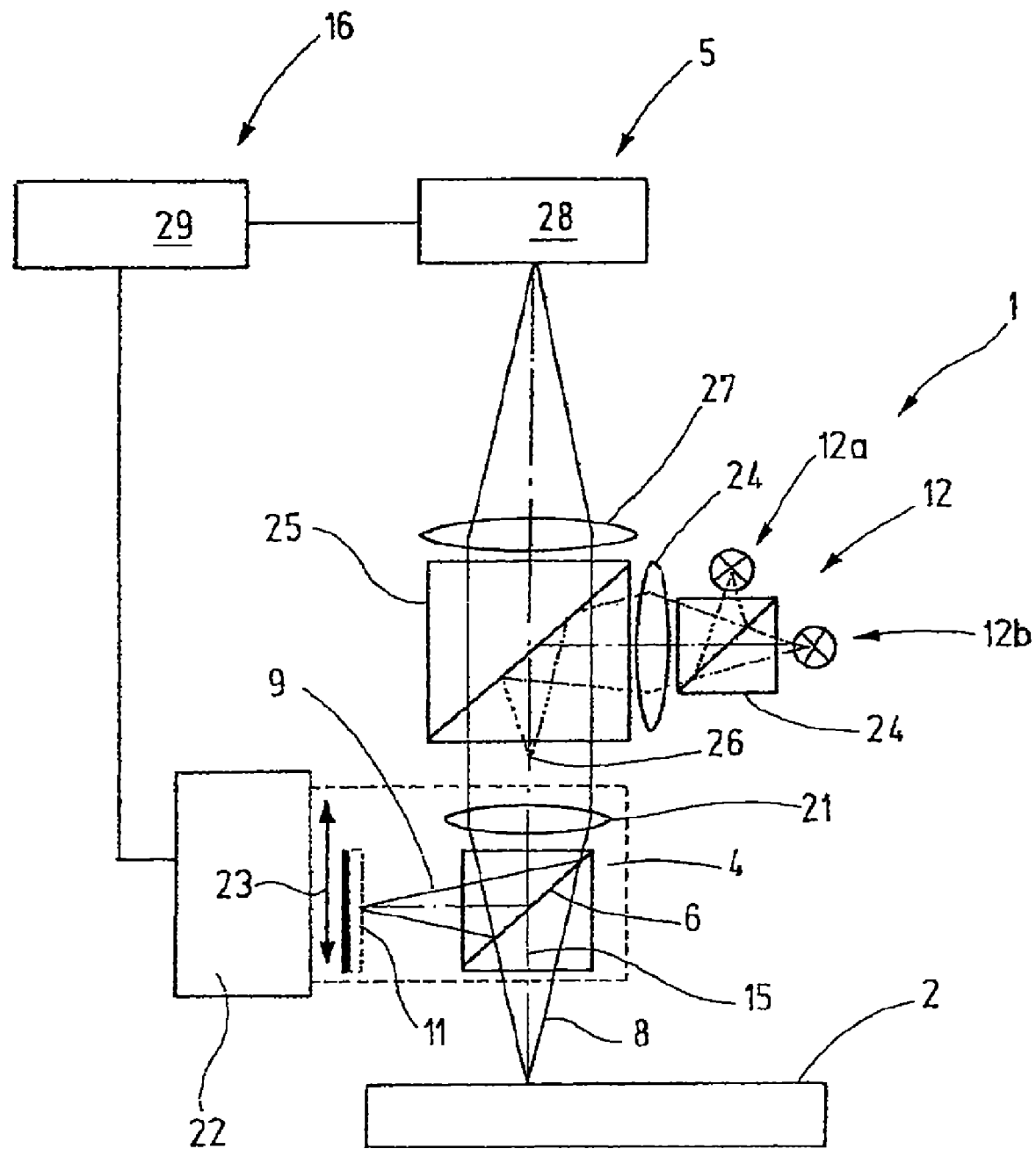
FIGS. 2 and 3 show a modified embodiments of measuring devices for implementing an alternative measuring method, shown in a schematic representation.

FIG. 2 shows a modified measuring device, employing a Michelsen interferometer for the interferometer 1, which includes an objective 4 with beam divider 6, as well as a lens 21. The light source is imaged on the input aperture plate of the lens 21. The beam divider 6 functions to divide the reference light path 9 and the measuring light path 8, which are subsequently combined again. The mirror 11 is assigned to the reference light path 9. The objective 4 is mounted on a positioning unit 22, so that it can traverse in the direction of arrow 23 and substantially at a right angle to the object surface 2. It must be noted, however, that in place of the objective it is also possible to move the reference mirror, the complete interferometer, or also the object to be measured in order to record the required sequence of interference images.

The light source 12 is a dual light source, comprising two individual light sources 12a, and 12b. These individual light sources are connected via a beam divider 24 to a joint optical path with therein arranged capacitor 24. An additional beam divider 25, which follows the capacitor 24, reflects the light from the light source 12 onto the input aperture plate 26 of the objective 4. In addition, the photo receiver 5 in the form of a detector array 28 is connected to the beam divider 25 via a tubular lens 27. The detector array, for example, is a pixel camera with 800×600 pixel resolution.

The evaluation circuit 16 is connected to the photo receiver 5 and, for the present embodiment, is a digital computer 29.

Figure 4:
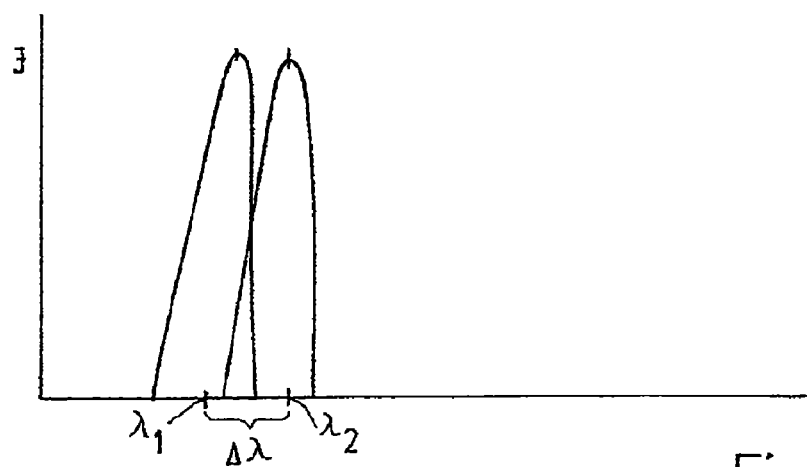
FIGS. 4 and 5 show spectra of different light sources used for the illumination.

The design of the light sources 12a, 12b represents a special feature of the above-described interferometer 1. These light sources are preferably embodied as short coherent and more or less narrow-band light sources, the spectra of which are shown in FIG. 4. The light sources 12a, 12b can be light-emitting diodes, for example. If the transmitted intensity is plotted over the wavelength of the emitted light, they can have spectra that overlap. Their mass center of wavelengths or spectral centroids $\lambda_1$, $\lambda_2$ differ by the amount of $\Delta\lambda$, which can range from less than 1 nm up to 200 nm. In particular, the wavelength difference $\Delta\lambda$ can be less than the width of the individual spectrum.

Figure 6:
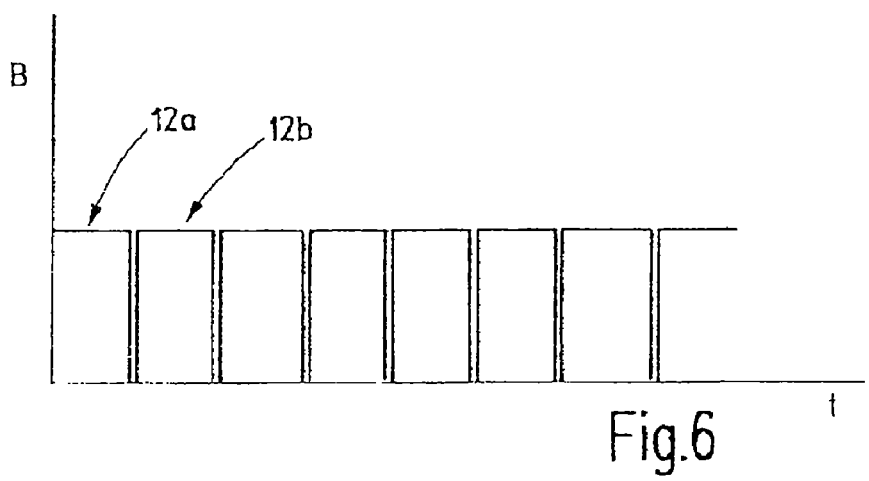
FIGS. 6 and 7 are time schematics for operating the light sources and recording the images in the form of a time diagram.

The light sources 12a, 12b in principle can light up at the same time, wherein the previously explained algorithm is then processed. However, it is advantageous if the light sources 12a, 12b are activated with a time delay, preferably alternating, as illustrated in FIG. 6 with a diagram showing the illumination B over the time t. While the light source 12a is lit, the light source 12b remains dark and vice versa.

Interference between the object wave and the reference wave then occurs on the detector array 28, regardless of which one of the light sources 12a, 12b is activated. The interferometric measurement is then realized by moving the objective 4 with the aid of the positioning unit 22 along the optical axis 15. Interference images are recorded for various equidistant height positions of the objective 4 and are evaluated by the digital computer 29. In the simplest case, the positioning unit 22 is then stopped each time to record the image, wherein initially an image illuminated by the light source 12a is recorded and then an image illuminated by the light source 12b. From the sequence of images obtained by moving the objective 4 with the positioning unit 22, a first estimated value for the phase difference $\Delta\phi$ is determined with the aid of the known synthetic wavelength $\Lambda$. In addition, the phase positions of the interference signals for both mass center of wavelengths $\lambda_1$, $\lambda_2$ can be determined with high precision. A first estimated value $\Delta z$ for the height can be determined from the difference $\Delta\phi$. Following the determination of the first estimated value $\Delta z_{syn}$ for the height difference, an improved estimated value can be found with the help of the above-listed minimum condition. The searched for estimated value $\Delta z_{hr}$ is then computed, in the same way as described in the above.

If $\Delta L$ is the scanning interval traversed between an image recorded with the spectral centroid $\lambda_1$ and an image recorded with the spectral centroid wavelength $\lambda_2$, then a constant offset must first be subtracted from the computed phase value $\phi_{2e}$:

$$\Delta\phi_2 = 4\pi\Delta L/\lambda_2$$

before the phase difference $\Delta\phi$ is determined.

Figure 7:
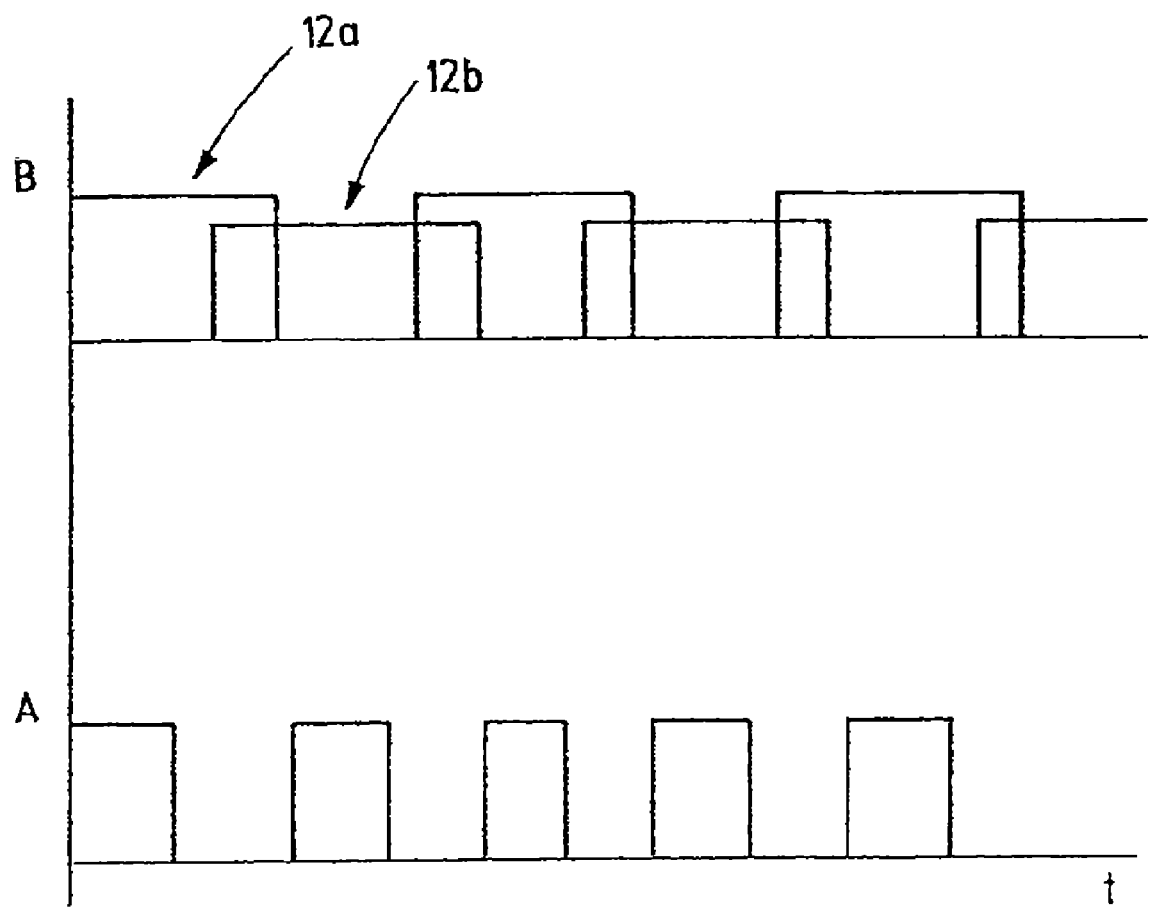

It is also possible to deactivate the light sources 12a, 12b alternately, as shown in FIG. 7. This is particularly important if the light sources 12a, 12b have a certain afterglow period and if these are switched with high clocking frequency. The image A in that case is always recorded as shown in FIG. 7, meaning at instances when only one of the two light sources 12a, 12b is lit, which can be achieved through a suitable synchronized readout of the detector array 28.

Figure 5:
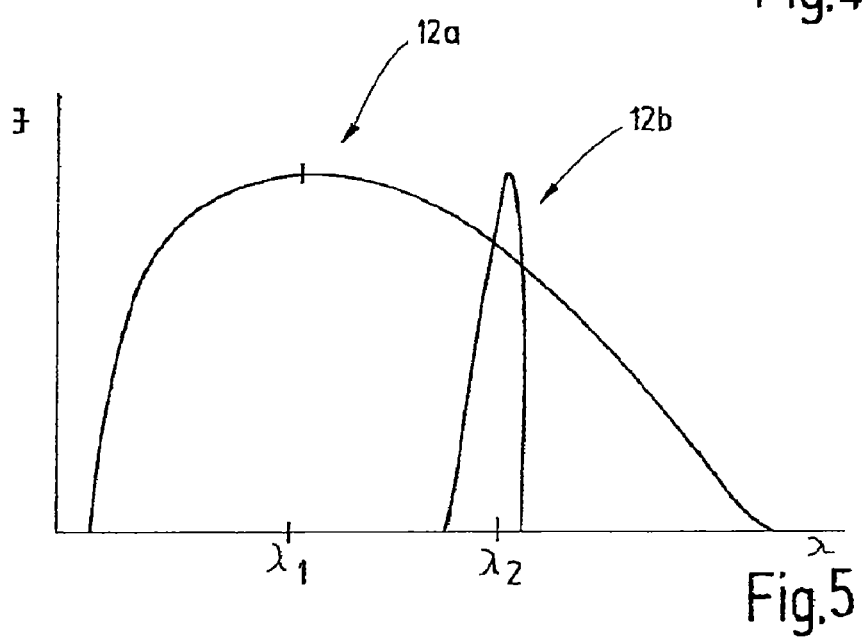

FIG. 5 shows that light sources 12a, 12b with different bandwidths can also be combined, thus making it possible to combine the advantages of the white-light interferometry, for example, with the advantages of the double-wavelength interferometry. For example, a relatively wide-band, chromatic, or also white light source having a mass center of wavelength or spectral centroid $\lambda_1$ can be used for the light source 12a, while a narrow-band light source with the spectral centroid $\lambda_2$ can be used for the second light source 12b. This type of arrangement makes it possible to first roughly localize the height position of the object with the aid of a coherence peak evaluation that is known from the white-light interferometry. For this, the narrow z range is used in which the length deviation between the measuring light path 8 and the reference light path 9 is shorter than the short coherence length of the white light. In a second step, the phase position of the synthetic wavelength relative to the position of the coherence peak is used to further delimit the height position. In a third step, the height position is determined precisely by using one or both gravity center wavelengths. This process involving three steps (first step: localizing the light range through coherence peak evaluation; second step: determining the phase position of the synthetic wavelength; third step: determining the z distance with the aid of one of the gravity center wavelengths) makes it possible to obtain a measuring range having a size of several 100 μm, as well as a resolution in fractions of a nanometer within this measuring range. The aforementioned three-step process is viewed as a particularly advantageous embodiment.

Figure 3:
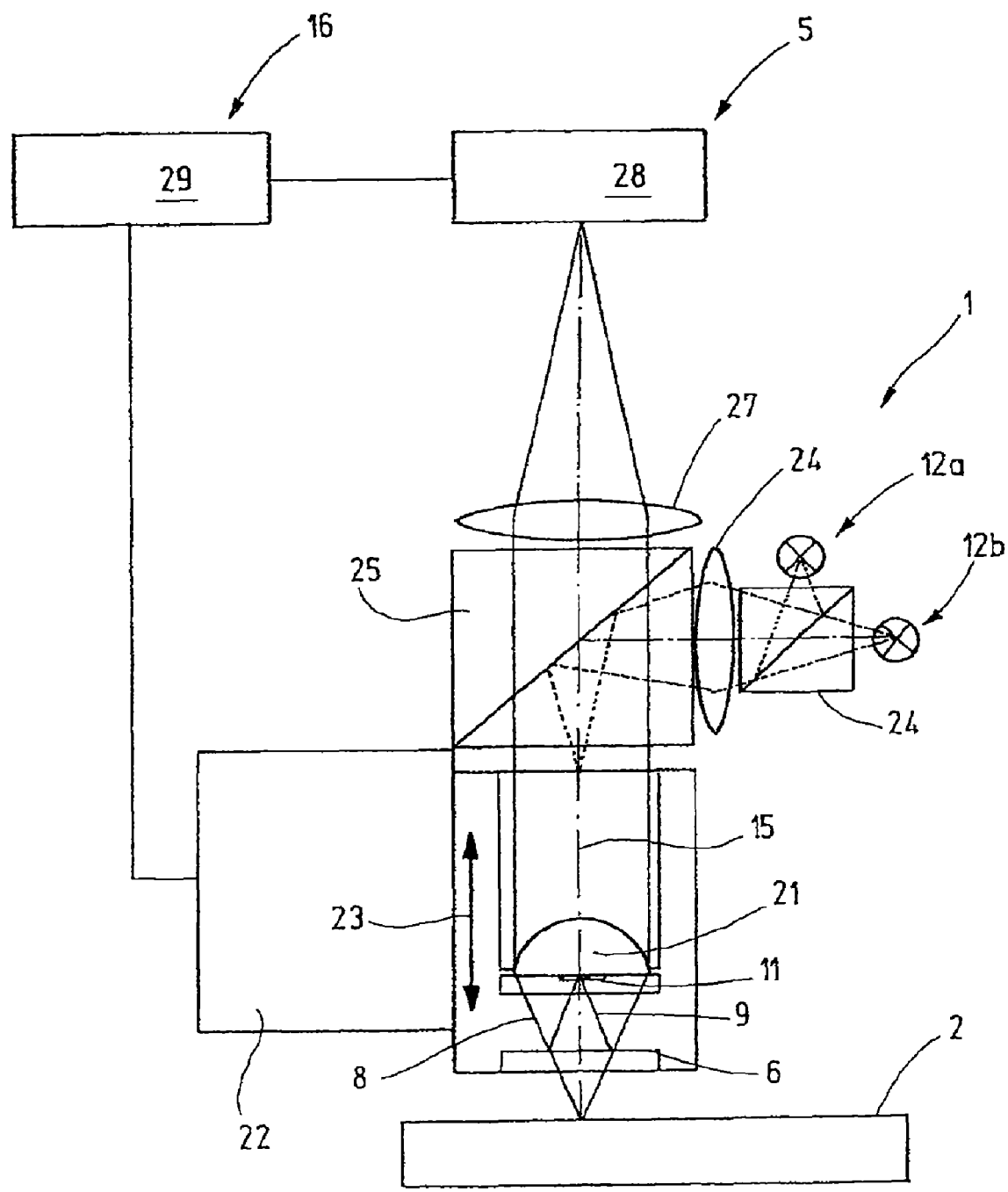

FIG. 3 illustrates a further modified embodiment of the measuring device, using a Mirau interferometer for generating interference images. We refer to the above description with use of the same reference numbers. The beam divider 6 is positioned at a right angle to the optical axis 15. The mirror 11 is positioned on the optical axis 15. Otherwise, the above description with all its variants, including the function, also applies in this case.

The interferometric measuring method for detecting the shape is based on the interferometric observation of an object surface under a narrow-band light. A relative movement between the interferometer 1 and the object surface 2 generates a measuring signal on a suitable photo receiver, for example a camera circuit 5. From this measuring signal, two signal frequencies $f_o$ and $f_o+\Delta f$ are extracted, which are located directly adjacent to each other. The phase difference between the two signal components is used for determining the distance and/or the change in distance $\Delta z$. The method has a large unambiguousness range and therefore provides a large depth measurement range. The method can also be used with workpieces having offset areas on the surface. The measurement is not disturbed along edges and offset areas and strongly inclined surfaces can also be examined, which have inclinations steep enough to prevent the use of conventional methods based on generating and evaluating interference lines because of the extremely dense positioning of the high interference lines.

What is claimed is:

1. A measuring method for detecting a deviation $\Delta z$ of a distance z of a plurality of surface points from an objective, comprising the steps of:
providing first and second light sources for which the spectral centroids differ by the wavelength difference $\Delta\lambda$ and which produce spectral components comprising a first signal frequency $f_o$ and of a second signal frequency $f_o+\Delta f$, where $\Delta f$ is sufficiently small that a beat frequency occurs in the inverse Fourier transformation, and wherein at least one of the light sources is short coherent;
dividing the light from the first and second light sources into a measuring light beam and a reference light beam;
simultaneously directing the measuring beam onto a two dimensional matrix of surface points and, following reflection by the matrix of surface points, combining the reference and measuring beams and directing the combined beam onto a photo receiver, whereby a length of a measuring light path traversed by the measuring light beam is changed relative to a length of a reference light path traversed by the reference light beam;
from a time-variant measuring signal containing spectral components produced by the photo receiver, extracting the two spectral components comprising a first signal frequency $f_o$ and a second signal frequency $f_o+\Delta f$ for the matrix of points;
determining the relative phase angles $\phi_1$ and $\phi_2$ of the first and second signal frequencies $f_o$ and $f_o+\Delta f$, respectively for the matrix of points; and
determining the deviation $\Delta z$ from the difference between the respective phase angles $\phi_1$ and $\phi_2$.

2. The measuring method as defined in claim 1, wherein the first and second light sources are alternately activated.

3. The measuring method as defined in claim 2, wherein the measuring signal produced by the photo receiver is read out if only one of the light sources is activated.

4. The measuring method as defined in claim 1, further including digitally filtering the time-variant signal emitted by the photo receiver.

5. The measuring method as defined in claim 4, wherein the first and second signal frequencies are simultaneously transmitted, and the filtering makes it possible to distinguish between the two signal frequencies, which differ by the frequency difference $\Delta f$.

6. The measuring method as defined in claim 1, wherein the frequency difference $\Delta f$ is fixed such that it corresponds to a wavelength difference $\Delta\lambda$ of the first and second signal frequencies, which is less than 10 nm.

7. The measuring method as defined in claim 1, wherein the frequency difference $\Delta f$ is fixed such that it corresponds to a wavelength difference $\Delta\lambda$ of the first and second signal frequencies, which is less than 5 nm.

8. The measuring method as defined in claim 1, wherein the frequency difference $\Delta f$ is fixed such that it corresponds to a wavelength difference $\Delta\lambda$ of the first and second signal frequencies, which is less than 1 nm.

9. The measuring method as defined in claim 1, wherein the light sources are narrow-band light sources.

10. The measuring method as defined in claim 1, wherein both light sources are short coherent.

11. The measuring method as defined in claim 1, wherein the light sources are chromatic light-emitting diodes.

12. The measuring method as defined in claim 1, further including scanning the time-variant signal at discrete instances to obtain a discrete measuring signal $s_n$ and multiplying the discrete measuring signals $s_n$ with a discrete predetermined window function $w_n$, as well as with a complex beat term of one of frequency f or $f+\Delta f$ of the complex frequency, and summing up multiple results to form a respective complex function $S(f_o)$ or $S(f_o+\Delta f)$.

13. The measuring method as defined in claim 12, including determining the phase position of the signal component with frequency f with the following fraction $$\varphi_{1e} = \arctan\left(\frac{\text{Im}\{S(f_o)\}}{\text{Re}\{S(f_o)\}}\right).$$

14. The measuring method as defined in claim 12, including determining the phase position of the signal component with frequency $f_o+\Delta f$ with the fraction:

$$\varphi_{2e} = \arctan\left(\frac{\text{Im}\{S(f_o+\Delta f)\}}{\text{Re}\{S(f_o+\Delta f)\}}\right).$$

15. The measuring method as defined in claim 1, including determining a phase difference $\Delta\phi$ from the phases $\phi_{1e}$ and $\phi_{2e}$, and from the equation:

$$\Delta z = \frac{\Lambda\Delta\varphi}{4\pi}$$

determining a first estimated value $\Delta z_{syn}$ for $\Delta z$, wherein $\Lambda$ is the difference of the reverse values for the light wavelengths $\lambda_1$ and $\lambda_2$.

16. The measuring method as defined in claim 15, further including determining an improved estimated values is determined from the estimated value by using the condition $$\left|\frac{m\lambda_o}{2} + \varphi_{1e}\frac{\lambda_o}{4\pi} - \Delta z_{syn}\right| = \text{minimum}$$

with m $\in$ { . . . , $-1$, 0, 1, 2, . . . } to determine a suitable whole-number multiple $m_o$, based on which the searched for estimated value $\Delta z_{hr}$ is determined from:

$$\Delta z_{hr} = m_o\lambda_o/2 + \phi_{1e}\lambda_o/4\pi.$$

17. The measuring method as defined in claim 1, wherein the light sources have a coherence length of at least 250 µm.

* * * * *